(12) United States Patent
Sasaki et al.

(10) Patent No.: US 6,473,390 B1
(45) Date of Patent: Oct. 29, 2002

(54) OPTICAL DISK DEVICE

(75) Inventors: Ichiro Sasaki, Chiba; Shigehisa Miyasaka, Tokyo, both of (JP)

(73) Assignee: Sony Computer Entertainment, Inc., Tokyo (JP)

( * ) Notice: Subject to any disclaimer, the term of this patent is extended or adjusted under 35 U.S.C. 154(b) by 0 days.

(21) Appl. No.: 09/551,104

(22) Filed: Apr. 18, 2000

(30) Foreign Application Priority Data

Apr. 23, 1999 (JP) ............................................ 11-117104

(51) Int. Cl.[7] .......................... G11B 23/00; G11B 25/00
(52) U.S. Cl. ....................................................... 369/271
(58) Field of Search .............................. 369/270, 271, 369/264, 258; 360/99.12

(56) References Cited

U.S. PATENT DOCUMENTS

| 4,514,839 A |   | 4/1985 | Eisemann ................. 369/270 |
| 5,761,186 A |   | 6/1998 | Mushika et al. ............ 369/271 |
| 5,799,006 A | * | 8/1998 | Mukawa ..................... 369/270 |
| 5,956,315 A | * | 9/1999 | Sawai et al. ................ 369/270 |
| 6,041,033 A | * | 3/2000 | Otsubo et al. .............. 369/271 |
| 6,072,767 A |   | 6/2000 | Iwazawa .................... 369/271 |
| 6,163,520 A | * | 12/2000 | Kobayashi et al. ......... 369/271 |

FOREIGN PATENT DOCUMENTS

| JP | 10-199081 | 7/1998 |
| JP | 10-208376 | 8/1998 |
| JP | 11-16236 | 1/1999 |
| TW | 376505 | 12/1999 |

\* cited by examiner

*Primary Examiner*—Robert S. Tupper
*Assistant Examiner*—Julie Anne Watko
(74) *Attorney, Agent, or Firm*—Katten Muchin Zavis Rosenman

(57) ABSTRACT

An optical disk device for correctly positioning on a turntable, an optical disk composed of two optical disks glued together, regardless of how poorly they are attached together. The device includes the turntable, on which the optical disk is placed, a disk holding part onto which a mounting hole of the optical disk is fitted, and a clamping member, which is provided on part of the circumferential surface in the disk holding part, is free to move in the radial direction of the disk holding part, and is impelled radially outward. The clamping member is formed in a mountain shape by two sloping faces and a sloping faces meet. The tip is beveled to a shape such that the tip makes a surface contact with the optical disk when the optical disk is mounted on the turntable.

14 Claims, 6 Drawing Sheets

OPTICAL DISK DEVICE

BACKGROUND OF THE INVENTION

1. Field of the Invention

The present invention relates to an optical disk device. More specifically, the present invention relates to an optical disk device having an improved clamping mechanism for an optical disk when a DVD-ROM or other optical disk having a composition in which two optical disks are glued together is mounted onto a turntable.

2. Background of the Invention

In recent years, along with the demand for greater recording density, optical disks have come into use in which two optical disks are glued together to form an integrated whole. For example, a so-called one-side readout glued-together disk has been proposed (see, for example, laid open patent application H11-3541, 1999). This is an optical disk in which the information on the two disks can be selectively read by shining a laser beam from one side of one of the laser disks and varying the focal point of the laser beam.

FIGS. 1A and 1B show an outline of an optical disk of this type. FIG. 1A is a cross-sectional view showing an enlargement of the part of an optical disk. As shown in FIG. 1A, optical disk 1 has a first disk 4, which has a first information recording part 3 on one side of a first substrate 2, and a second disk 7 which has a second information recording part 6 on one side of a second substrate 5 opposite first disk 4. First disk 4 and second disk 7 are glued together by a resin layer 8 which consists of ultraviolet-ray-hardened resin, etc.

Optical disk 1 having such a structure is shaped in a donut-disk form as shown in FIG. 1B and has a mounting hole 9 in its center for mounting onto an optical disk device.

An optical disk device for reading information recorded on optical disk 1 of this type or for recording information onto optical disk 1 has a turntable on which to place optical disk 1, and it has a structure by which mounting hole 9 of optical disk 1 is fitted and fixed onto a disk holding part provided in its middle.

FIG. 2A is a cross-sectional view showing an enlargement of the disk holding part in a conventional optical disk device. As shown in FIG. 2A, a conventional optical disk device has on part of the circumferential surface of disk holding part 100 a clamping member 101 that is free to move in the radial direction. The clamping member 101 is at all times urged outward by an urging member such as a coil spring which is not shown.

The surface of clamping member 101 has a mountain shape, and its tip 101a has a pointed angle or a shape with a slight rounding. Therefore optical disk 1 makes contact with the tip 101a at a point or along a line.

That is, when mounting hole 9 of optical disk 1 is fitted onto the disk holding part 100 from above as shown in the diagram, the inner or inside circumferential surface of mounting hole 9 of the optical disk 1 comes into contact with an upper sloping face 101b of clamping member 101, and clamping member 101 moves inward (to the right as shown in the diagram) by the component force of the fitting-in force. When optical disk 1 is fitted in as far as tip 101a of clamping member 101, the inner circumferential surface of the mounting hole 9 comes into contact with tip 101a of clamping member 101 at a point or along a line.

There has been concern that if the gluing-together of the two disks is poor in the optical disk 1 that is thus fitted in as far as tip 101a of clamping member 101. Specifically, if there is a poor gluing-together of the disks 4, 7 in the part near the mounting hole 9, tip 101a of clamping member 101 that makes contact at a point or along a line, exerts a wedge effect, and as shown in FIG. 1B, and it may get in between the first optical disk 4 and second optical disk 7 (where the gluing-together is poor).

As a result, there has been concern that clamping member 101 will peel apart the first optical disk 4 and the second optical disk 7 and expand the region where poor gluing-together occurs, or make the fitting-in of optical disk 1 worse, making it impossible to place optical disk 1 onto the turntable in the correct condition.

SUMMARY OF THE INVENTION

An object of this invention, which was devised in consideration of the above-described circumstances, is to provide an optical disk device in which correct positioning onto a turntable can be done for an optical disk having a structure in which two optical disks are glued together, regardless of whether the gluing-together is poor.

This and other objects of the present invention are attained by an optical disk device on which an optical disk is mounted, which optical disk is formed by gluing together a first optical disk and a second optical disk and which has a mounting hole in the middle; the optical disk device comprising a turntable on which the optical disk is placed, a disk holding part that protrudes from the middle of the turntable and onto which fits the mounting hole of the optical disk; and a clamping member provided on part of a circumferential surface in the disk holding part, said clamping member being free to move radially and being impelled radially outward.

The clamping member has a mountain-live shape formed by its first and second sloping faces, and a tip positioned at the boundary of the sloping faces and shaped so as to make a surface contact with the optical disk.

For example, by beveling the tip of the clamping member to be parallel to the mounting direction of the optical disk, the tip of the clamping member can be made to make a surface contact with the optical disk.

Thus by giving the tip of the clamping member a shape that ensures a surface contact with the optical disk, even when the tip comes into contact with the glued-together part of the optical disk, a force that acts on the optical disk is dispersed, the glued-together parts do not peel apart and the clamping member does not get in between the parts, whereby a correct positioning of the optical disk on the turntable is assured.

DESCRIPTION OF THE PREFERRED EMBODIMENTS

An embodiment of the present invention is now described in detail in the following, making reference to the drawings.

Figure 3:
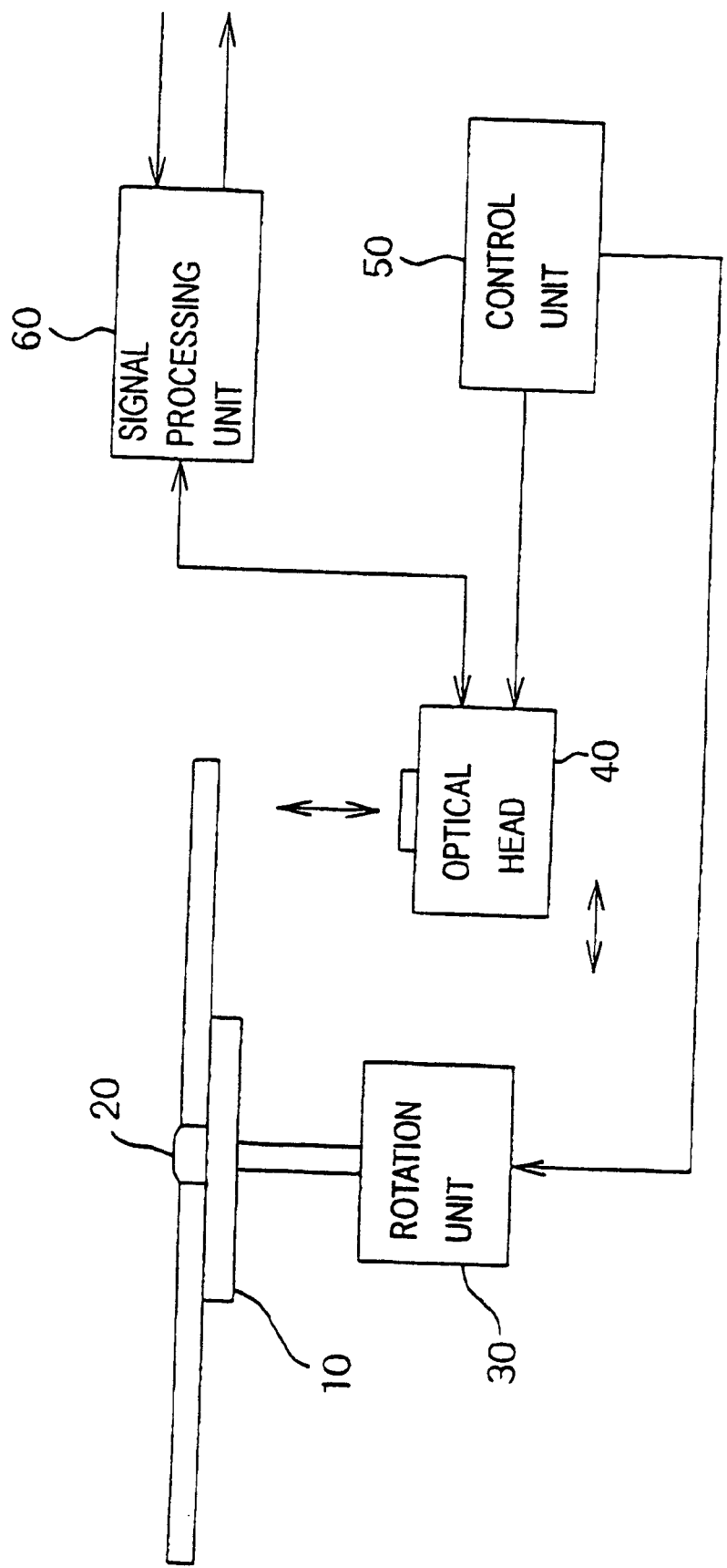
FIG. 3 diagrammatically shows an overall structure of the optical disk device of the present invention.

FIG. 3 shows the overall composition of an optical disk device relating to this embodiment.

First, referring to FIG. 3, we describe the overall composition of the optical disk device. The optical disk device has a turntable 10, on which an optical disk 1 is placed, a disk holding part 20 for holding optical disk 1 on the top surface of the turntable 10, a rotation unit 30 which includes a spindle motor, etc., for rotating turntable 10, an optical head 40 for optically reading the information recorded on optical disk 1 and recording information onto optical disk 1, a control unit 50 for controlling the rotation unit 30 and optical head 40, and a signal processing unit 60 for the signals read or recorded by optical head 40.

In order to accurately read the information that is recorded on optical disk 1 and to record information onto optical disk 1 without error, it is considered necessary to correctly place optical disk 1 onto turntable 10. Disk holding part 20 which is a constituent element for thus correctly placing optical disk 1, has the functions of positioning optical disk 1 in the correct position on turntable 10 and holding it in position.

Figure 4:
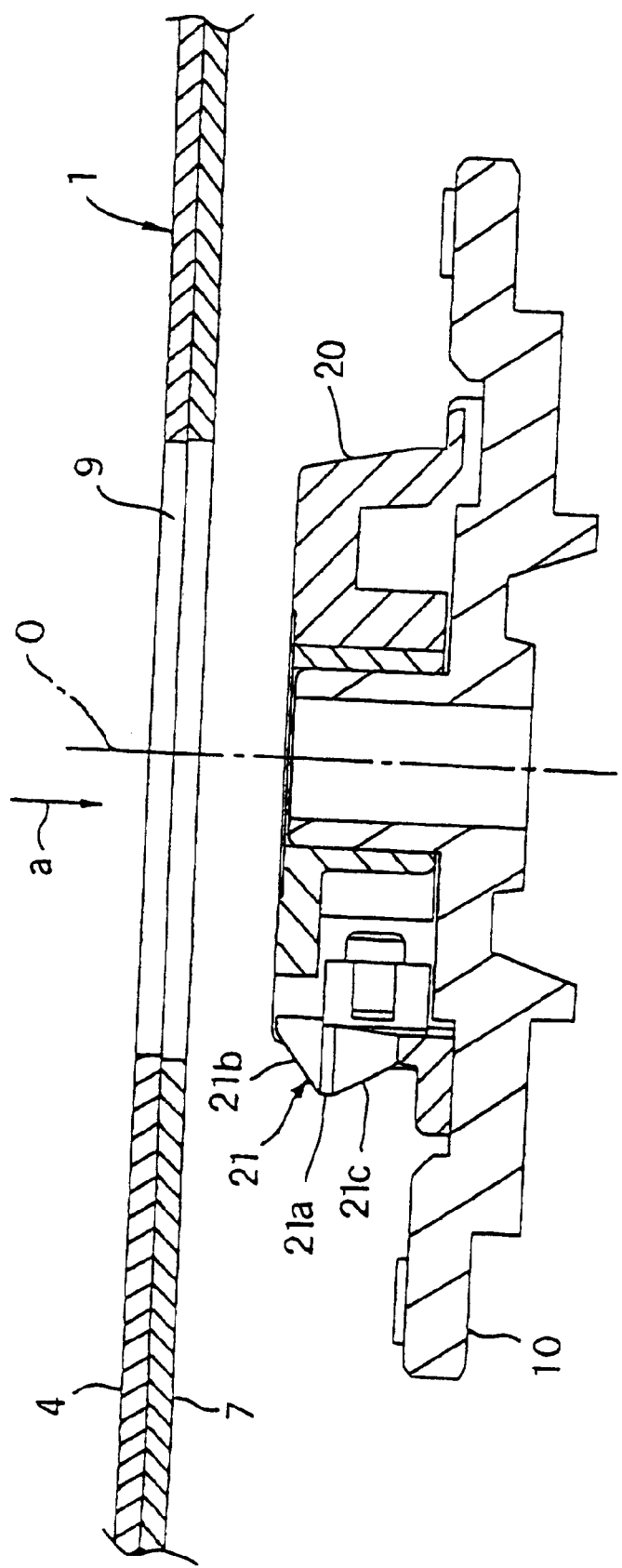
FIG. 4 is a cross-sectional view showing an enlargement of the disk holding part of the optical disk device the state before the optical disk has been placed on the turntable.
Figure 5:
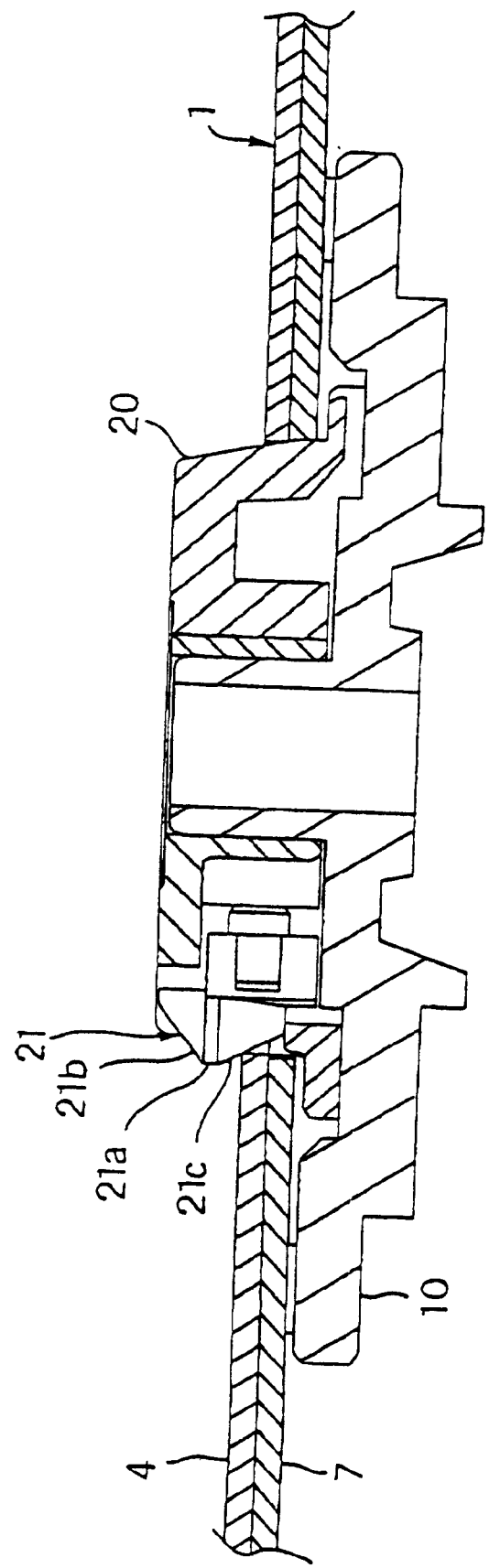
FIG. 5 is a cross-sectional view of the enlarged disk holding part of the device in the state when the optical disk is placed on the turntable.

FIGS. 4 and 5 are cross-sectional views showing an enlargement of the disk holding part 20.

Disk holding part 20 is situated so as to protrude upward from the middle of turntable 10 and has an outside diameter that matches the mounting hole 9 in optical disk 1. Therefore when mounting hole 9 of optical disk 1 is fitted onto disk holding part 20, optical disk 1 is positioned concentrically with disk holding part 20. Here, optical disk 1 is fitted on from above parallel to rotation axis O of turntable 10 as shown by arrow "a" in FIG. 4.

Figure 6:
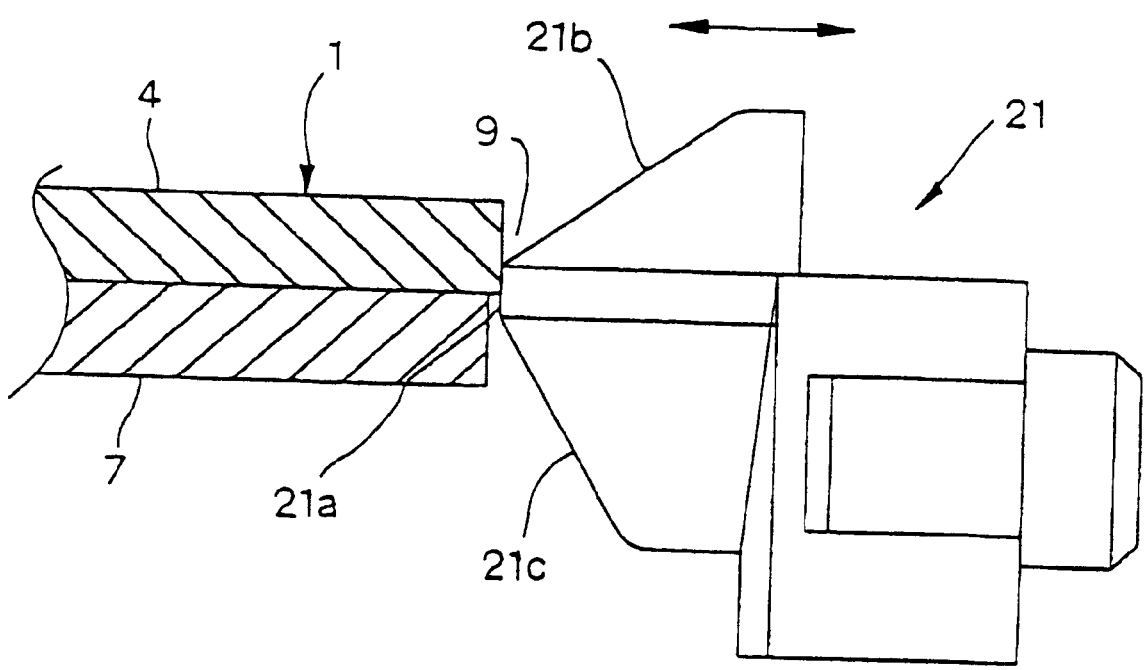
FIG. 6 is a cross-sectional view showing an enlargement of the clamping member provided. on the disk holding part of the optical disk device.

A clamping member 21 is provided on part of the circumferential surface of disk holding part 20. The optical disk 1 is held by the clamping member 21. Clamping member 21 is free to move in the radial direction of disk holding part 20, and at all times it is impelled outward by an urging means such as a coil spring which is not shown. As shown in FIG. 6, the surface of clamping member 21 is formed into a mountain shape by first and second sloping faces 21b and 21c, and its tip 21a is beveled to be roughly parallel to the mounting direction of optical disk 1 (the direction of arrow "a" in FIG. 4 that is, roughly parallel to rotation axis O of turntable 10). The width of this beveling can be set arbitrarily.

When mounting hole 9 of optical disk 1 is fitted onto disk holding part 20, the inner circumferential surface of mounting hole 9 of optical disk 1 comes into contact with first sloping face 21b of clamping member 21 (its upper sloping face), and clamping member 21 moves inward by the component force of the fitting-in force. When optical disk 1 is fitted on as far as tip 21a of clamping member 21, clamping member 21 moves farthest inward and a large pressure is exerted on the inner circumferential surface of mounting hole 9. Then when optical disk 1 goes beyond tip 21a of clamping member 21, the inner circumferential surface of mounting hole 9 of optical disk 1 comes into contact with second sloping face 21c of clamping member 21 (its lower sloping face), becomes positioned along the sloping face 21c, and is placed on turntable 10 (see FIG. 5).

Figure 1A:
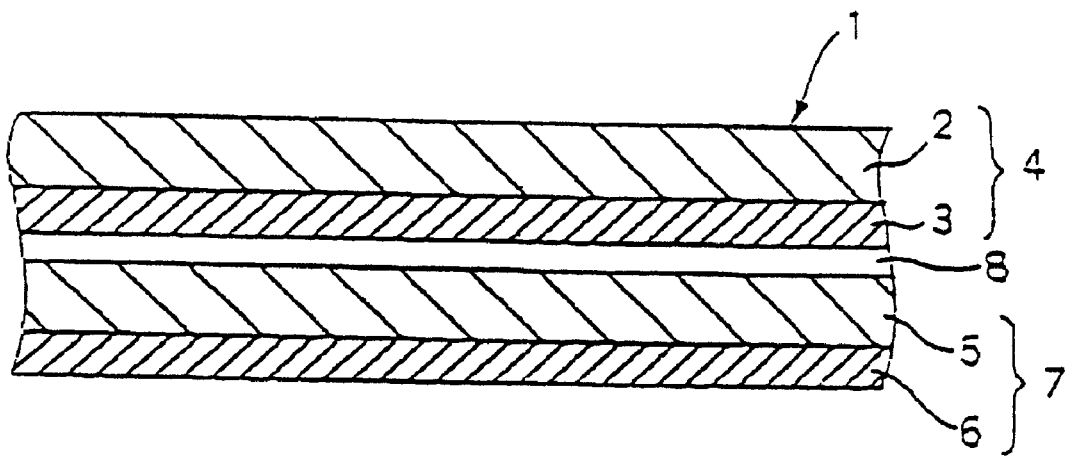
FIG. 1A and FIG. 1B schematically shows the overall composition of an optical disk device of the prior art.
Figure 1B:
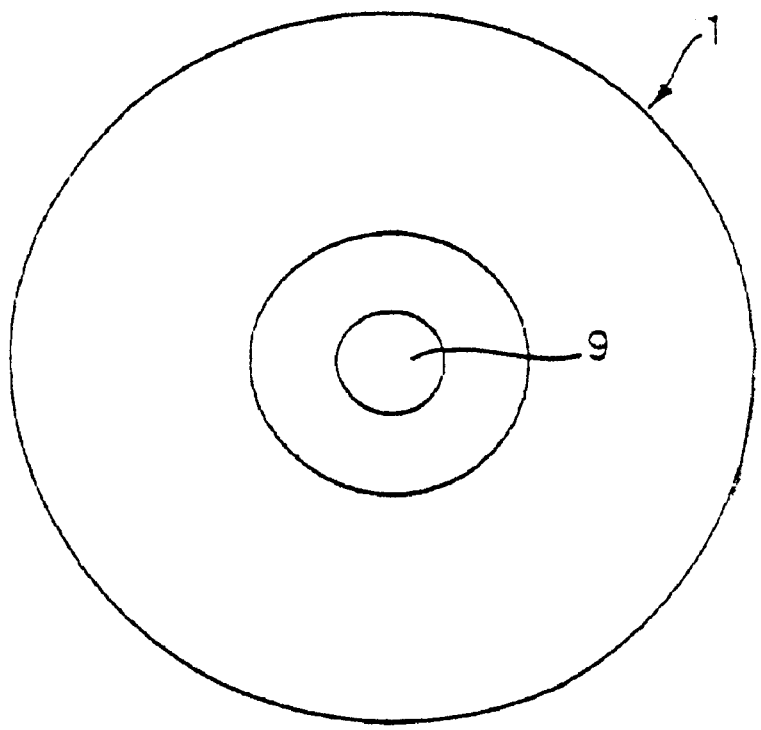
Figure 2A:
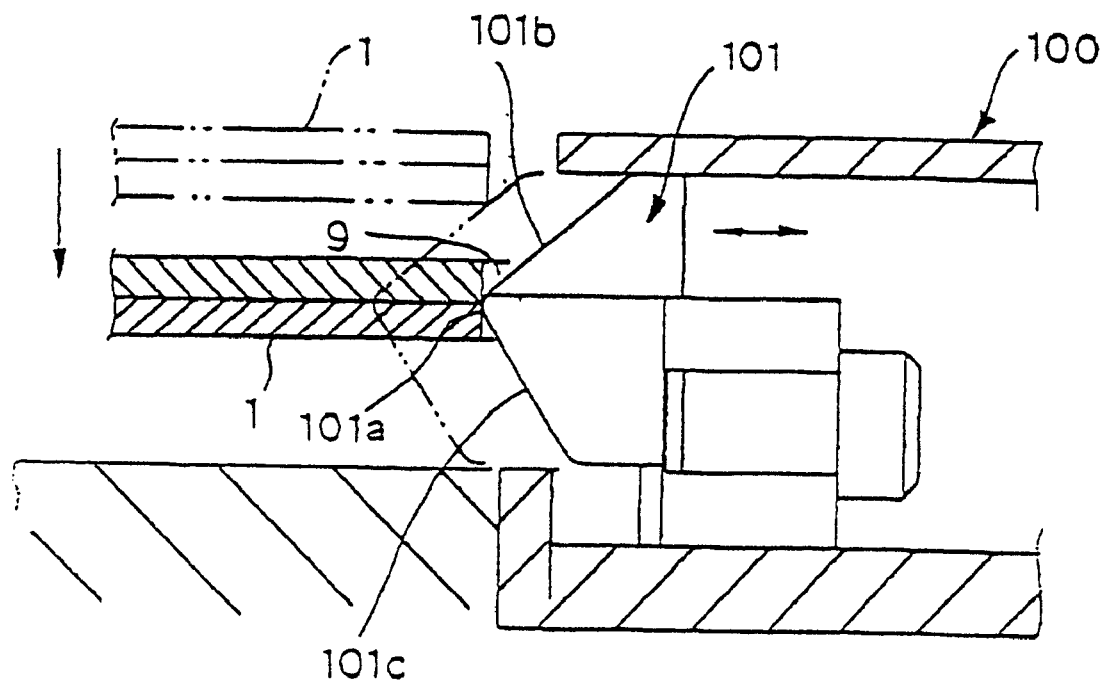
FIG. 2A and 2B show cross-sectional views of an enlargement of the disk holding part of the conventional optical disk device.
Figure 2B:
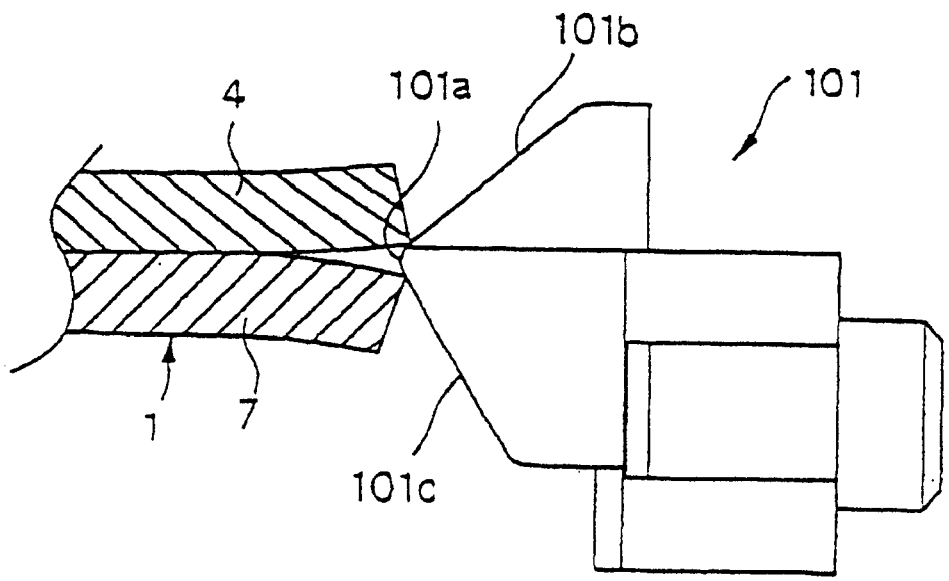

In such a process by which part of mounting hole 9 of optical disk 1 is fitted onto disk holding part 20, tip 21a of clamping member 21 makes a surface contact with the inner circumferential surface of mounting hole 9 (see FIG. 6), thereby dispersing the load that clamping member 21 exerts on optical disk 1. In the case of an optical disk 1 having a structure in which two optical disks 4 and 7 are glued together as shown in FIG. 1A, even if the adhesion where they are joined together is poor, the load that acts on optical disk 1 is dispersed as described above, so there is no danger that tip 21a of clamping member 21 will push in between the glued-together parts of optical disk 1.

This invention is not limited to the above working example. Variant shapes and improvements such as the following are included in the technical scope of this invention.

A feature of this invention is that the clamping member of the disk holding member makes not a point contact but rather a surface contact with the inside circumferential surface of the mounting hole of the optical disk, as seen in the cross-sectional view. Therefore, for example in an optical disk device that has a mechanism whereby after the optical disk is positioned on the disk holding member, the clamping member stretches (extends) outward and engages with the optical disk, the aforementioned first sloping face 21b (the upper sloping face) and second sloping face 21c (the lower sloping face) are not needed.

Even in an optical disk drive of the type in which the optical disk is mounted while pushing and expanding the clamping member as in the above-described working example, only first sloping face 21b (the upper sloping face) is needed, and the second sloping face 21c (the lower sloping face) is not needed.

It should be noted that other modifications and improvements which those skilled in the art can do on an everyday basis are also included in the technical scope of this invention.

As described above, with this invention the tip of the clamping member is shaped so as to make a surface contact with the optical disk so that an optical disk that consists of two optical disks fastened together can be placed in its correct position on the turntable regardless of whether they are fastened together poorly.

As a result, the relative position of the optical disk and the optical head can be kept in the prescribed state at all times, and information can be surely read from and written to the optical disk regardless of the state in which optical disks are fastened together.

What is claimed is:

1. An optical disk device for mounting an optical disk that is formed by gluing together a first optical disk and a second optical disk and has a mounting hole in a center thereof, said optical disk device comprising:

a turntable, and a disk holding part provided on said turntable and adapted to receive an optical disk, a clamping member provided on part of a circumferential surface of said disk holding part and adapted to hold an optical disk by being impelled outward in a radial direction of said disk holding part when an optical disk is placed on said turntable, wherein said clamping member further comprises an upper sloping surface, a lower sloping surface, and a contact surface disposed therebetween, said contact surface being shaped to provide a surface contact with an inner circumferential surface of a mounting hole of said optical disk.

2. The optical disk device as described in claim 1, wherein said contact surface is beveled parallel with a mounting direction of said optical disk.

3. The optical disk device as described in claim 1, wherein said upper sloping surface and said lower sloping surface are oriented at different angles with respect to the contact surface.

4. The optical disk device as described in claim 1, wherein each of said upper and lower sloping surfaces slope away from said contact surface.

5. The optical disk device as described in claim 4, wherein each of said upper and lower sloping surfaces slope away from said contact surface in opposite sloping directions.

6. The optical disk device as described in claim 1, wherein said contact surface is dimensioned to prevent separation of an optical disk during mounting of an optical disk on said turntable.

7. An optical disk device on which is mounted an optical disk that is formed by gluing together a first optical disk and a second optical disk and has a mounting hole in a center thereof, the optical disk device comprising:

- a turntable adapted for placement of an optical disk thereon;
- a disk holding part laterally protruding from a center of said turntable and adapted to accommodate the mounting hole of an optical disk being fitted on said disk holding part; and
- a clamping member provided on part of a circumferential surface on said disk holding part and being radially movable on said disk holding part and impelled outward in the radial direction,
- said clamping member being a mountain shape formed by a first outwardly sloping face and a second inwardly sloping face and a tip,
- wherein said first and second sloping faces meet said tip having a shape such that said tip makes surface contact with said optical disk.

8. The optical disk device as described in claim 7, wherein said tip further comprises a contact surface dimensioned to prevent separation of said first and second optical disks during mounting of an optical disk on said turntable.

9. The optical disk device as described in claim 7, wherein said tip separates said upper and lower sloping faces and further comprises a contact surface that is beveled parallel with a mounting direction of said optical disk.

10. A clamping member for a holding an optical disk on an optical disk device turntable, comprising:

- a first sloping surface, a second sloping surface, and a contact surface disposed therebetween,
- wherein said clamping member is slidably adjustable in response to the mounting of an optical disk on said turntable and is impelled by an urging means during mounting of an optical disk on an optical disk device turntable, and
- wherein said contact surface is beveled parallel with a mounting direction of said optical disk and is adapted to make surface contact and not point contact with an optical disk mounted on said turntable.

11. The clamping member as described in claim 10, wherein said first surface and said second surface are oriented at different angles with respect to said contact surface.

12. The clamping member as described in claim 10, wherein each of said first and second surfaces slope away from said contact surface.

13. The clamping member as described in claim 12, wherein each of said first and second surfaces slope away from said contact surface in opposite sloping directions.

14. The clamping member as described in claim 10, wherein said contact surface is dimensioned to prevent separation of an optical disk during mounting of an optical disk on said turntable.

\* \* \* \* \*